(12) United States Patent
Bricker

(10) Patent No.: US 6,289,601 B1
(45) Date of Patent: Sep. 18, 2001

(54) DIPSTICK GUIDE APPARATUS

(76) Inventor: Melvin E. Bricker, 2723 Saddleback Dr., Cincinnati, OH (US) 45244

( * ) Notice: Subject to any disclaimer, the term of this patent is extended or adjusted under 35 U.S.C. 154(b) by 0 days.

(21) Appl. No.: 09/407,449

(22) Filed: Sep. 28, 1999

(51) Int. Cl.[7] .................................................. G01F 23/04
(52) U.S. Cl. ........................... 33/726; 33/726; 33/722; 33/730; 73/290 R; 73/290 B
(58) Field of Search .......................... 33/721, 722, 723, 33/724, 725, 726, 727, 728, 729, 730, 731; 73/290 R, 290 B

(56) References Cited

U.S. PATENT DOCUMENTS

| | | | |
|---|---|---|---|
| 2,995,824 | * | 8/1961 | Wells ................................. 33/730 |
| 3,311,984 | * | 4/1967 | Stux et al. .......................... 33/729 |
| 3,623,372 | * | 11/1971 | Markey ........................... 73/290 R |
| 4,155,167 | | 5/1979 | DeLano . |
| 4,640,126 | * | 2/1987 | Jansch ............................ 73/290 R |
| 4,894,926 | | 1/1990 | Suhr . |
| 5,025,569 | | 6/1991 | Lalevee, Sr. . |
| 5,042,167 | | 8/1991 | Link . |
| 5,113,594 | * | 5/1992 | Ishihara et al. ................... 33/722 |
| 5,154,005 | | 10/1992 | Lalevee, Sr. . |
| 5,241,753 | | 9/1993 | Lalevee, Sr. . |
| 5,598,602 | * | 2/1997 | Gibson ........................... 15/210.1 |

* cited by examiner

Primary Examiner—John Barlow
Assistant Examiner—Maria Fernandez
(74) Attorney, Agent, or Firm—Wood, Herron & Evans, LLP

(57) ABSTRACT

A dipstick guide assembly for guiding a free end of a dipstick into a dipstick tube. The dipstick guide assembly comprises a clamp secured to an upper portion of the dipstick tube, a guide member and an adjustment mechanism for fixing the position of the guide member. The guide member has a portion removed therefrom so as to enable to aid in removing the dipstick from the guide member. The adjustment mechanism fixes the guide member in a position such that the distal end of a guided dipstick is introduced into the mouth of a dipstick tube.

19 Claims, 3 Drawing Sheets

DIPSTICK GUIDE APPARATUS

FIELD OF THE INVENTION

This invention relates to a dipstick guide apparatus used to measure the level of lubrication oil in a crankcase of an internal combustion engine.

BACKGROUND OF THE INVENTION

Checking the oil level in the crankcase of an internal combustion engine of an automobile is a common practice for automobile owners and operators. Traditionally this service has been performed by gasoline service attendants at gasoline stations. With the proliferation of self-service gasoline stations, the task of checking the oil level in the automobile's crankcase is left to the individual owner. Often this task is done in the automobile owner's garage or other location in which the lighting conditions are less than ideal.

In order to properly check the oil level in the crankcase, the operator must pull the handle of the dipstick out of a dipstick tube located on the side of the engine crankcase and typically communicating with an oil reservoir associated with the crankcase. The dipstick tube extends upwardly away from the crankcase and has an open top end located beside the engine crankcase. The dipstick commonly has a cap located immediately below the handle of the dipstick which is adapted to cover the open end of the dipstick tube in order to seal the tube and to properly seat the dipstick in the dipstick tube in order to accurately measure the level of oil in the crankcase. Once the dipstick is removed from the interior of the dipstick tube, the oil dipstick is wiped clean with a rag or other piece of material in order to provide an accurate reading when the dipstick is reinserted into the interior of the dipstick tube. The distal end of the dipstick is then inserted into the open end of the dipstick tube and the dipstick pushed downwardly, forcing the distal end of the dipstick down inside the interior of the dipstick tube until the cap of the dipstick properly seats on top of the open end of the dipstick tube, and the distal end is disposed within the reservoir in proper extension to take the measure of the level of any oil therein.

Typically the dipstick tube has an open end of a small diameter which is difficult to locate with the distal end of the dipstick. Additionally, the dipstick tube is often in a location which is difficult to reach and poorly illuminated. Consequently, placing the distal or free end of the dipstick inside the open end of the dipstick tube requires both hands of the operator, one hand to find the tube and then hold the dipstick handle and the other hand to guide the distal end of the dipstick into the interior of the dipstick tube. Additionally, this task exposes the operator to the risk of having his or her hands and apparel dirtied and stained with oil dripped from the dipstick in the process of handling the dipstick.

Different apparatus for aiding an operator in guiding a dipstick into a dipstick tube have been developed. U.S. Pat. No. 4,894,926 discloses a dipstick guide adapted to aid in the insertion of a dipstick into a dipstick tube. The dipstick guide has a frusto-conical skirt which fits over the open end of the dipstick and a guide handle with a slot therethrough. The slot is adapted to slide over the handle of the dipstick so that the dipstick guide may be suspended from the dipstick when the dipstick is properly located inside the dipstick tube.

U.S. Pat. No. 4,155,167 also discloses a dipstick guide which may be secured to a dipstick tube. This dipstick guide has a clamp which fits around the exterior of an upper portion of a dipstick tube in order to secure the dipstick guide to the dipstick tube. The dipstick guide has a conical housing which is coaxial with the axis of the dipstick tube and extends upwardly above the open end of the dipstick tube. The dipstick guide disclosed in this patent also has a small lamp which aids in the user properly locating the free end of the dipstick inside the conical housing of the dipstick guide.

Three additional patents, U.S. Pat. Nos. 5,025,569; 5,145,005 and 5,241,753, each disclose a dipstick guide constructed of one piece of wire wrapped around the upper portion of a dipstick tube. At the upper end of the dipstick guide the wire is wrapped into a funnel member which may be moved to different positions in order to help guide the distal end of a dipstick into engagement with the open end of a dipstick tube. A portion of the wire connecting a center coil of the dipstick guide to the funnel member causes the funnel member to return to an upstanding position directly above the dipstick tube with the dipstick tube axis being coaxial with a funnel axis defined by the funnel member. U.S. Pat. Nos. 5,154,005 and 5,241,753 also disclose different variations of a dipstick guide having a conical upper portion which is coaxial with the axis of the dipstick tube.

Each of the dipstick guides disclosed in these patents has a funnel-shaped portion which is biased or moved to return to a position in which the axis of the funnel portion is coaxial with the axis of the dipstick tube. In order to locate the distal end of the dipstick inside the funnel portion of the dipstick guide, the operator must move the distal end of the dipstick downwardly in a generally vertical direction into engagement with the funnel portion of the dipstick guide. Oftentimes, due to the location of the hood of the vehicle or other obstacles, it is difficult to properly orient the dipstick and move the dipstick in the proper direction.

Therefore, it has been one objective of the present invention to provide a dipstick guide apparatus which enables an operator to quickly and easily guide the distal end of a dipstick into a dipstick tube from a position other than directly above the dipstick tube.

It has further been an objective of the present invention to provide a dipstick guide apparatus which comprises a guide member which is adjustably mounted in such a way as to enable an operator to easily find a dipstick tube opening in limited or low light conditions.

It has further been an objective of the present invention to provide a dipstick guide apparatus having a guide member which has a portion removed therefrom so as to enable a dipstick to be removed easily and quickly from the guide member once the distal end of the dipstick is located partially within the interior of a dipstick tube.

SUMMARY OF THE INVENTION

In a preferred embodiment, the invention provides a relatively wide, easy-to-locate guide member positioned proximate to but spaced from the mouth of a dipstick tube. The guide member is aligned to the side of the mouth so that a dipstick operationally disposed in the guide member is aimed directly at an interior wall of the dipstick tube below or interior of the tube mouth. Once the guided dipstick is felt to engage that wall, it is lifted away from the guide member and in general alignment with the axis of the tube before being pushed into the tube and reservoir for measuring the oil level. Since the guide member is spaced apart from tube mouth, it does not obstruct access for oil filling or other access, and does not require the initially guided dipstick to be fully extended vertically in alignment with the tube axis where it may be obstructed, for example, by the hood of a vehicle.

The dipstick guide apparatus of the present invention which accomplishes these objectives comprises a guide member and an adjustment mechanism or mount extending between the guide member and a dipstick tube. The dipstick guide apparatus functions to guide a distal end of a dipstick into the interior of a dipstick tube having a dipstick tube axis, and is secured to an upper portion of a dipstick tube. A clamp may be used to secure the dipstick guide apparatus to the upper portion of a dipstick tube. However, the dipstick guide apparatus may be welded or otherwise secured to the upper portion of a dipstick tube without a clamp.

The guide member of the dipstick guide assembly may assume different configurations in accordance with the present invention. However, in each of these configurations the guide member has a centrally located guide axis and at least one dipstick guiding surface. Additionally, the guide member has a longitudinal portion cut out from its wall so as to enable a dipstick to be removed from inside the guide member once its function is served. The guide member of the present invention also may have a plurality of holes therethrough in order to aid the operator in placing the distal end of the dipstick into engagement with the guide member. The holes allow more light to pass through the guide member, thus aiding the operator in locating the distal end of the dipstick inside the guide member. One configuration of the guide member of the present invention is a funnel-shaped member having a flared upper portion and a tapered lower portion. The tapered lower portion terminates in a lower end or edge of a fixed diameter which is less than the diameter of the dipstick tube in order to aid diameter which is less than the diameter of the dipstick tube in order to aid the operator in locating the interior of the dipstick tube with the distal end of a dipstick.

The clamp of the dipstick guide apparatus is secured to an upper portion of a dipstick tube. The clamp may be temporarily or permanently secured to the upper portion of the dipstick tube. In one preferred embodiment of the present invention, the clamp comprises a screw clamp which may be tightened and loosened with a conventional screwdriver and may be easily removed from the dipstick tube for cleaning, readjustment or any other purpose.

The adjustment mechanism or mount of the dipstick guide apparatus of the present invention extends between the guide member and the clamp and functions to adjust the position of the guide member relative to the dipstick tube. More particularly, the adjustment mechanism enables the guide member to be fixed in a position in which the guide axis of the guide member preferably forms an acute angle with the dipstick tube axis which is usually vertically oriented but may be oriented differently.

Of course, and more broadly, it is desirable that the guide axis and/or the dipstick guiding surface on which the dipstick moves be directed in a direction such that the distal end of a guided dipstick is aimed acutely at the mouth of the dipstick tube when the dipstick is moved longitudinally toward the mouth.

Although two configurations of adjustment mechanism are illustrated and described in this application, the adjustment mechanism may assume multiple different configurations. This application is not intended to limit the structure or configuration of the adjustment mechanism. One preferred adjustment mechanism comprises a pair of links. A lower link is pivotally secured to the clamp of the dipstick guide apparatus, and an upper link is welded or otherwise secured to the guide member. The upper and lower links are pivotally secured together so that one link may move relative to the other link, enabling an operator to adjust the position of the guide member and its axis relative to the stationary dipstick tube and its axis. Alternatively, the adjustment mechanism may be a bendable piece of metal which is welded at its upper end to the guide member and secured to the dipstick tube at its lower end.

The adjustment mechanism enables an operator to fix the position of the guide member so that the guide axis forms an acute angle with the dipstick tube axis, enabling the guide member to guide the dipstick into the dipstick tube.

These and other objects and advantages of the invention will be more readily apparent from the following description of the drawings in which:

DETAILED DESCRIPTION OF THE DRAWINGS

Figure 1:
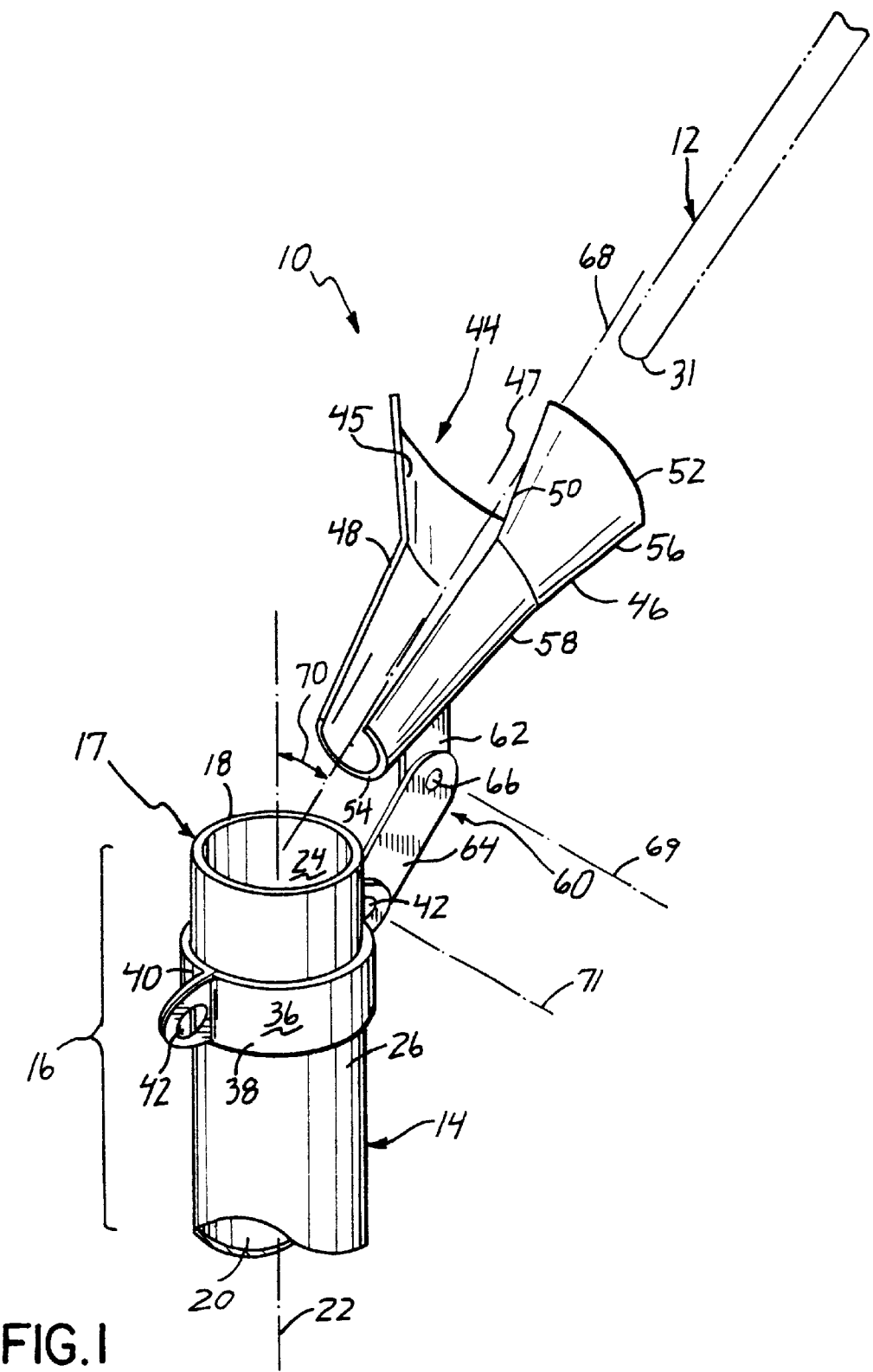
FIG. 1 is a perspective view of one embodiment of the dipstick guide apparatus of the present invention secured to a dipstick tube.

Referring to the drawings, and particularly to FIG. 1, there is illustrated a dipstick guide apparatus 10 used to guide a dipstick 12 into a dipstick tube 14. The dipstick tube 14 is only partially illustrated, the remainder of the dipstick tube extending downwardly inside a crankcase or oil reservoir (not shown) of an internal combustion engine. The dipstick tube 14 has an upper portion 16 terminating in an open end or mouth 17. The dipstick guide apparatus 10 is secured to the upper portion 16 of the dipstick tube 14. The dipstick tube has a cylindrical wall 18 which is circular in cross-section but may be other configurations as well. The wall 18 of the dipstick tube has an inner surface 24 and an outer surface 26. The dipstick tube wall defines a hollow interior 20 of the dipstick tube 14 and a dipstick tube axis 22. The dipstick tube 14 is illustrated as being vertical but may be in other orientations as well.

Figures 2A, 2C:
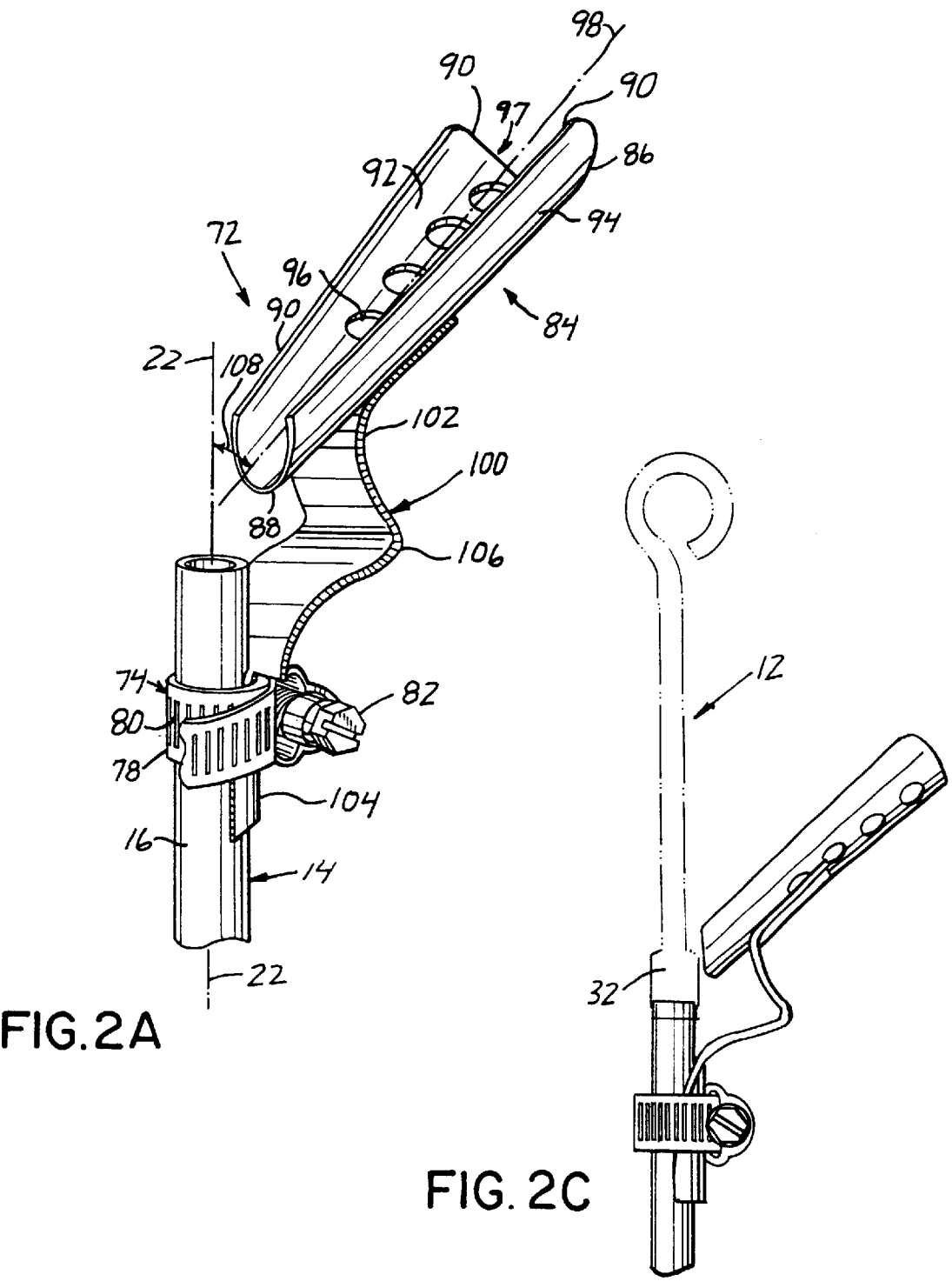
FIG. 2A is a perspective view of a second embodiment of the dipstick guide apparatus of the present invention secured to a dipstick tube.
FIG. 2C is a side elevational view of the dipstick guide apparatus of FIG. 2A with the dipstick illustrated in phantom fully inserted inside a dipstick tube.
Figure 2B:
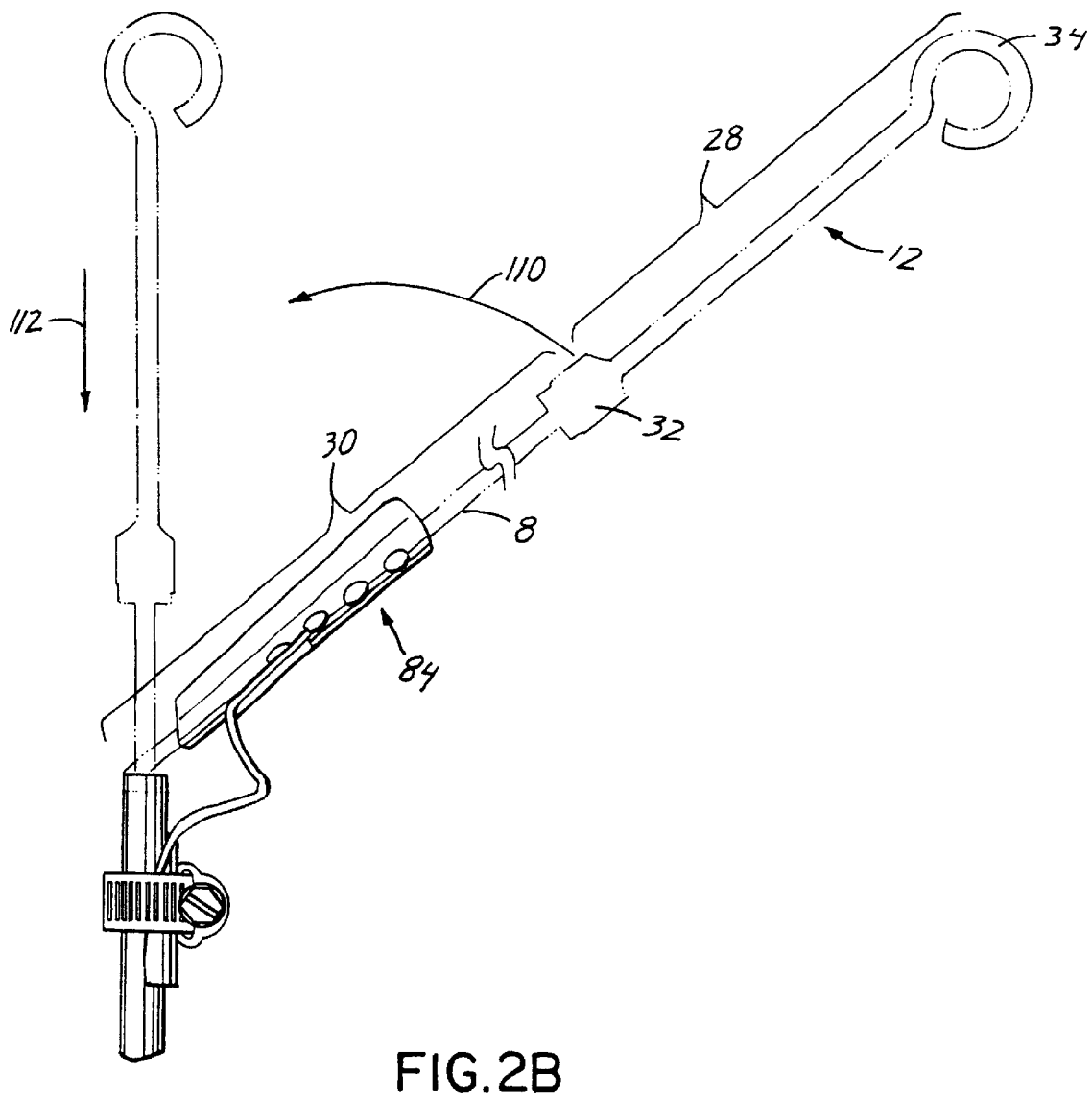
FIG. 2B is a side elevational view of the dipstick guide apparatus of FIG. 2A with a guided dipstick shown in phantom.

As best illustrated in FIG. 2B, the dipstick 12 has a handle portion 28 and a measuring portion 30 terminating in a distal end 31. The lower end of the handle portion 28 comprises a cap 32 adapted to fit over the open end or mouth 17 of the dipstick tube 14 as illustrated in FIG. 2C. The upper end of the handle portion 28 terminates in a loop 34 in which an operator may place his or her finger in order to remove the dipstick 12 from the interior of the dipstick tube 14. Although one configuration of dipstick is illustrated and described, other configurations of dipsticks may be used in accordance with the present invention.

The dipstick 12 and dipstick tube 14 are not components of the present invention. Therefore, this application is not intended to limit the size or configuration of dipstick or dipstick tube which may be used with the dipstick guide apparatus of the present invention.

Referring back to FIG. 1, one preferred embodiment of dipstick guide apparatus will be illustrated and described. This preferred embodiment of dipstick guide apparatus 10 comprises a clamp 36 surrounding and secured to the upper portion 16 of the dipstick tube 14. The clamp 36 is illustrated as being two pieces of metal 38,40 joined together with a pair of fasteners 42. Although one form of clamp is illustrated and described in this preferred embodiment of dipstick guide assembly, other configurations of clamps such as the screw clamp illustrated in FIGS. 2A–2C may be used in accordance with the embodiment illustrated in FIG. 1.

Another component of this preferred embodiment of dipstick guide apparatus is a guide member 44. The guide member 44 has a dipstick guiding or inside surface 45 and an outside surface 46. The guide member 44 also has an opening or cutout portion 47 defined between two side edges 48,50 of the guide member 44. The guide member 44 has a funnel-shaped configuration including a guide axis 68, a top edge 52 and a lower edge 54. The lower edge 54 of the guide member has a diameter less than the diameter of the dipstick tube 14. The guide member 44 also has a flared upper portion 56 and a tapered lower portion 58 which are both concentric about guide axis 69. Thus the guide member 44 may be referred to as a funnel member and the guide axis 68 may be considered a funnel axis. While the guide member is preferably symmetrically formed about its axis, it will be appreciated that other shapes could be used.

The last component of the dipstick guide apparatus 10 illustrated in FIG. 1 is an adjustment mechanism or mount 60. The adjustment mechanism 60 extends between the guide member 44 and the dipstick tube 14 for supporting the guide member 44 in spaced relationship from the mouth 17 of the dipstick tube 14. The adjustment mechanism 60 is used to adjust the position of the guide member 44 relative to the dipstick tube 14 in order to properly guide the distal or free end 31 of the dipstick 12 into engagement with the inner surface 24 of the dipstick tube 14. The adjustment mechanism 60 comprises an upper link 62 which is welded or otherwise secured to the guide member 44 and a lower link 64. The upper and lower links 62,64 are pivotally joined together with a fastener 66 so that the links rotate about an axis 68. The lower link 64 is pivotally joined to the clamp 36 with one of the fasteners 42 as illustrated in FIG. 1, enabling lower link 64 to rotate about axis 71. The ability of the upper and lower links 62,64 to move relative to one another and the pivotal connection between the lower link 64 and the clamp 36 enables the guide member 44 to be fixed in a position in which the guide axis 68 preferably forms an acute angle 70 with the dipstick tube axis 22 (see FIG. 1).

The ability of the dipstick guide apparatus of the present invention to assume a position in which the guide axis 68 preferably forms an acute, intersecting angle 70 with the dipstick tube axis 22 enables an operator to quickly and easily guide the distal end 13 of the dipstick 12 into contact with the inside surface 24 of the dipstick tube 14. The operator can feel the end of the dipstick engage the tube wall, indicating the dipstick is in the tube. He or she then lifts the dipstick 12 away from the guide member 44 and into general alignment with the dipstick tube for insertion therein. Of course, the upper end of the dipstick may be flexed during this initial insertion, but since the distal end 13 is already captured in the tube, the flexing force does not make it harder to properly locate the tube 14 with the end of the dipstick, nor are two hands required. Only one hand is necessary for the entire guide and insertion procedure. Thus the operator is able to place the dipstick inside the dipstick tube without a great deal of effort and trouble.

FIGS. 2A–2C illustrate a second preferred embodiment of dipstick guide apparatus of the present invention. Referring to FIG. 2A, this embodiment of dipstick guide assembly 72 comprises a clamp 74 secured to an upper portion of a dipstick tube. For the sake of simplicity, the reference numerals used to describe the dipstick tube illustrated in FIG. 1 will be used to describe the dipstick tube illustrated in FIGS. 2A–2C. Thus, the clamp 74 is secured to the upper portion 16 of dipstick tube 14. The clamp 74 is illustrated as being a screw clamp comprising a band 78 having a series of slots 80 therein and a screw 82 which is used to tighten the band to a narrower diameter as is conventional and known in the art.

The dipstick guide apparatus 72 further comprises a guide member 84 having an upper edge 86, a lower edge 88 and a pair of opposed side edges 90. The guide member 84 further has a dipstick guiding surface 92, an outer surface 94 and a plurality of holes 96. The holes 96 allow light to pass through the guide member 84, thus helping the operator locate the guide member 84 in poor lighting conditions. Although not illustrated, the guide member 44 of the first preferred embodiment illustrated in FIG. 1 may have openings therethrough to enable light to pass through the guide member. Although the holes 96 are illustrated as being circular, they may be of alternative configurations and at alternative locations. The guide member 84 has a guide axis 98 about which the guide member 84 is preferably concentric, but other shapes could be used as well.

The guide member 84 has a cutout portion or opening 97 between the side edges 90 of the guide member. This cutout portion or opening 97 enables the dipstick 12 to be removed from inside the guide member 84 of the dipstick guide assembly 72 once the distal end 13 of the dipstick 12 contacts the inner surface 24 of the dipstick tube 14.

Another component of the second preferred embodiment of dipstick guide apparatus 72 is an adjustment mechanism or adjustable mount 100 comprising a bendable piece of metal. The adjustment mechanism 100 is welded or otherwise secured to the outside surface 94 of the guide member 84 as illustrated in FIG. 2A. The adjustment mechanism 100 comprises an upper portion 102 and a lower portion 104. The upper portion 102 extends downwardly from the guide member 84 and has a bend 106 formed therein. The lower portion 104 of the adjustment mechanism 100 is located inside the clamp 74 and abuts against the dipstick tube 14 so that when the clamp 74 is tightened, the lower portion 104 of the adjustment mechanism 100 is secured to the dipstick tube in the desired location. Because the adjustment mechanism 100 is a bendable piece of metal, the position of the guide member 84 may be adjusted so that the guide axis 98 preferably forms an acute intersecting angle 108 with the dipstick tube axis 22.

With either of the embodiments illustrated and described, the clamp may be omitted and the adjustment mechanism or mount welded to the upper portion 16 of the dipstick tube 14. In the embodiment illustrated in FIG. 1, the lower link 64 of the adjustment mechanism 60 may be welded or otherwise secured to the upper portion 16 of the dipstick tube 14. In the embodiment illustrated in FIGS. 2A–2C, the lower portion 104 of the adjustment mechanism 100 may be welded or otherwise secured to the upper portion 16 of the dipstick tube 14.

FIGS. 2B and 2C illustrate the method of using the dipstick guide apparatus of the present invention in order to guide a dipstick into the interior of a dipstick tube. As illustrated in FIG. 2B, a dipstick 12 is laid on top of the guide member 84 so that the measuring portion 30 of the dipstick 12 contacts the dipstick guiding surface 92 of the guide member 84. The dipstick 12 then is moved downwardly until the distal end 13 of the dipstick 12 contacts the inner surface 24 of the dipstick tube 14, temporarily stopping the downward movement of the dipstick 12.

Once the distal end 31 of the dipstick 12 contacts the inside surface 24 of the dipstick tube 14, an operator raises the handle portion 28 of the dipstick 12 in the direction of arrow 110 to a generally vertical orientation (shown in phantom in FIG. 2B) or any gently curved configuration allowing further dipstick insertion. In order to accomplish this, the measuring portion 30 of the dipstick 12 passes through the cutout portion 96 of the guide member 84. The dipstick 12 is then moved downwardly in the direction of arrow 112 by pushing downwardly on the handle portion 28 of the dipstick or moving it along its axis, causing the distal end 31 of the dipstick 12 to move downwardly inside the interior of the dipstick tube. The dipstick 12 is moved downwardly in the direction of arrow 112 until the cap 32 of the dipstick 12 covers the open end 17 of the dipstick tube 14 as illustrated in FIG. 2C.

As best illustrated in FIG. 2C, the guide member 84 is outwardly spaced slightly from the dipstick tube 14 so as to enable the cap 32 of the dipstick 12 to move downwardly without contacting the guide member, and to allow other access to the tube, particularly where it may serve as an oil filler. Once the cap 32 of the dipstick 12 is properly covering the open end 17 of the dipstick tube 14, the dipstick 12 is in a proper position in order to accurately measure the amount of oil in the crankcase of the engine. The dipstick 12 may then be freely removed by lifting up on the handle portion 28 of the dipstick without any interference from the dipstick guide assembly of the present invention. Thereafter, replacement or makeup oil can be introduced as appropriate and the dipstick re-seated, by means of the guide if needed, to seal the tube.

Of course, while the axis of the guide member in both these embodiments preferably acutely intersects the tube axis, the operational geometry is more broadly defined as having the geometric guide axis directed in a direction such that the distal end of a guided dipstick is aimed at the tube mouth while guided toward it.

While the embodiments described above are explained in terms of intersecting axes geometry, the axis of the guide and the axis of the tube may not, in fact, intersect; the only requirement being that the guided dipstick end be introduced within the mouth of the tube.

Moreover, and while reference to a guide axis or tube axis is made herein, it will be appreciated that the invention contemplates a guide member defining one or more guiding surfaces for the dipstick and orienting the dipstick so that upon its longitudinal movement towards the dipstick tube, its distal end is introduced into the mouth of the tube and preferably but not necessarily into engagement with a wall of the tube. Thus very different guide configurations may be used within the scope of this invention.

Thus, the dipstick guide apparatus of the present invention may be quickly and easily attached to the upper portion of a dipstick tube in order to aid an operator in quickly and easily locating the distal end of the dipstick inside the interior of this dipstick tube. While I have described two preferred embodiments of the present invention, those skilled in the art will appreciate other changes and modifications which may be made, such as different types of adjustment mechanisms, without departing from the spirit of the invention of this application. Therefore, I do not intend to be limited except by the scope of the following claims.

I claim:

1. A dipstick guide apparatus for guiding a distal end of a dipstick into a mouth of a dipstick tube having a dipstick tube axis, said dipstick guide apparatus comprising:

a guide member having at least one dipstick guiding surface, a clamp for supporting said guide member proximate said dipstick tube, an adjustment mechanism extending between said guide member and said clamp for supporting said guide member in spaced relationship from said mouth of said dipstick tube, said adjustment mechanism comprising links pivotally secured to each other and being adjustable to position said guide member in a fixed position such that a dipstick supported on said at least one dipstick guiding surface of said guide member is oriented so that a distal end of said dipstick is introduced into said mouth of said dipstick tube upon moving said dipstick along said at least one dipstick guiding surface of said guide member toward said mouth of said dipstick tube.

2. The dipstick guide apparatus of claim 1 wherein said at least one dipstick guiding surface slidably receives said dipstick.

3. The dipstick guide apparatus of claim 1 wherein said distal end of said dipstick is aligned by said at least one dipstick guiding surface to engage a wall of said dipstick tube.

4. A dipstick guide apparatus for guiding a distal end of a dipstick into a mouth of a dipstick tube having a dipstick tube axis, said dipstick guide apparatus comprising:

a guide member having at least one dipstick guiding surface, a clamp for supporting said guide member proximate said dipstick tube, a mount extending between said guide member and said clamp for supporting said guide member in spaced relationship from said mouth of said dipstick tube, said mount being adjustable to position said guide member in a fixed position such that a dipstick supported on said at least one dipstick guiding surface of said guide member is oriented so that a distal end of said dipstick is introduced into said mouth of said dipstick tube upon moving said dipstick along said at least one dipstick guiding surface of said guide member toward said mouth of said dipstick tube wherein said guide member comprises an elongated member having an opening for sidewise removal of a dipstick after said distal end of said dipstick is introduced into mouth of said dipstick tube.

5. A dipstick guide apparatus for guiding a distal end of a dipstick into a dipstick tube having a dipstick tube axis, said dipstick guide apparatus comprising:

a guide member having a guide axis and a portion cut out therefrom so as to enable the dipstick to be removed from the guide member when at least a portion of said dipstick is disposed within said dipstick tube, and an adjustment mechanism extending between said guide member and said dipstick tube for adjusting the position of said guide member, said guide member being fixed in a position in which said guide axis is directed acutely toward said dipstick tube axis.

6. The dipstick guide apparatus of claim 5 wherein said guide member is a funnel member.

7. The dipstick guide apparatus of claim 6 wherein said funnel member has a flared upper portion and a tapered lower portion.

8. The dipstick guide apparatus of claim 5 wherein said adjustment mechanism comprises a pair of links.

9. The dipstick guide apparatus of claim 5 wherein the guide axis is directed in a direction such that the distal end of a dipstick supported by said guide is aimed at the mouth of the dipstick tube.

10. A dipstick guide apparatus for guiding a distal end of a dipstick into a dipstick tube having a dipstick tube axis, said dipstick guide apparatus comprising:

a funnel member having a funnel axis and a portion cut out therefrom so as to enable the dipstick to be removed from the funnel member when at least a portion of said dipstick is disposed within said dipstick tube, and an adjustment mechanism extending between said funnel member and said dipstick tube for adjusting the position of said funnel member, said funnel member being fixed in a position in which said funnel axis is directed acutely toward said dipstick tube axis wherein said dipstick tube has a fixed diameter and said funnel member has a lower edge of a fixed diameter, said fixed diameter of said lower edge of said funnel member being smaller than the diameter of said dipstick tube.

11. A dipstick guide apparatus for guiding a distal end of a dipstick into a dipstick tube having a dipstick tube axis, said dipstick guide apparatus comprising:

a funnel member having a portion cut out therefrom so as to enable the dipstick to be removed from the funnel member, said funnel member having a funnel axis, an adjustment mechanism secured to said funnel member for adjusting the position of said funnel member relative to said dipstick tube, said adjustment mechanism being secured to an upper portion of said dipstick tube, said funnel member being fixed in a position in which said funnel axis is directed acutely toward said dipstick tube axis.

12. The dipstick guide apparatus of claim 11 wherein the funnel axis acutely intersects said dipstick tube axis.

13. The dipstick guide apparatus of claim 11 wherein said funnel member has holes therethrough.

14. The dipstick guide apparatus of claim 11 wherein a clamp secures said adjustment mechanism to said upper portion of said dipstick tube.

15. The dipstick guide apparatus of claim 11 wherein said adjustment mechanism is a bendable piece of metal.

16. The dipstick guide apparatus of claim 11 wherein said adjustment mechanism is welded to said funnel member.

17. The dipstick guide apparatus of claim 11 wherein said funnel member is spaced from said mouth of said dipstick tube.

18. A method of inserting a dipstick into a dipstick tube using a dipstick guide apparatus, said dipstick tube having an open end and a hollow interior defining a dipstick tube axis, said dipstick having a handle, a cap and a distal end, said dipstick guide apparatus comprising a clamp fixedly secured to an upper portion of the dipstick tube, a guide member having a guide axis and a cutout portion, and an adjustment mechanism extending between said guide member and said clamp, said method comprising:

adjusting said guide member with said adjustment mechanism until said guide member is fixed in a position in which said guide axis is directed in a direction such that the distal end of a dipstick guided by said guide member is introduced into said open end of said dipstick tube, placing said dipstick into said guide member, moving said handle of said dipstick toward said open end of said tube until said distal end of said dipstick contacts an inside surface of said dipstick tube, lifting said dipstick so said dipstick passes through said cutout portion of said guide member, moving said distal end of said dipstick downwardly inside said interior of said dipstick tube until said cap of said dipstick covers said open end of said dipstick tube.

19. A dipstick guide apparatus for guiding a distal end of a dipstick into a dipstick tube having a dipstick tube axis and a fixed diameter, said dipstick guide apparatus comprising:

a funnel member having a funnel axis, and an adjustment mechanism extending between said funnel member and said dipstick tube for adjusting the position of said funnel member, said funnel member being fixed in a position in which said funnel axis is directed toward said dipstick tube axis wherein said funnel member has a lower edge of a fixed diameter, said fixed diameter of said lower edge of said funnel member being smaller than the diameter of said dipstick tube.

* * * * *